United States Patent [19]

Kruse

[11] 4,042,551

[45] Aug. 16, 1977

[54] POLYMERIC POLYBLENDS HAVING IMPROVED MELT FLOW

[75] Inventor: Robert L. Kruse, Springfield, Mass.

[73] Assignee: Monsanto Company, St. Louis, Mo.

[21] Appl. No.: 678,268

[22] Filed: Apr. 19, 1976

[51] Int. Cl.² .............................................. C08L 91/00
[52] U.S. Cl. ............................ 260/28.5 B; 260/876 R
[58] Field of Search ...................... 260/28.5 B, 876 R

[56] References Cited

U.S. PATENT DOCUMENTS

| 3,506,740 | 4/1970 | Dempsey et al. | 260/876 R |
| 3,907,930 | 9/1975 | O'Grady | 260/876 R |

*Primary Examiner*—Melvyn I. Marquis
*Attorney, Agent, or Firm*—Joseph S. Nelson; William J. Farrington; James C. Logomasini

[57] ABSTRACT

The invention relates to polystyrene polyblends reinforced with grafted rubbers having improved melt flow without loss of tensile strength or toughness by incorporating 1 to 5 weight percent of a polyethylene wax having a molecular weight of from about 500 to 2400 and a dispersion index of from about 1–5.

13 Claims, No Drawings

POLYMERIC POLYBLENDS HAVING IMPROVED MELT FLOW

BACKGROUND OF THE INVENTION

The polyblends of the present invention are known commercially as high impact polystyrene (HIPS). The HIPS polyblends are used in large quantities in molded articles for packaging and appliances. The reinforcing rubber phase gives improved toughness but acts as a filler reducing flow during molding.

The trend to deep cavity molds for injection molding and vacuum forming has made it necessary that the HIPS polyblends have ever increasing melt flow without decreasing toughness or tensile strength in the molded parts. Plasticizers and lubricants have been studied to increase the flow of the rigid matrix phase but loss of toughness and tensile strength have placed serious limitations on this approach to the problem.

U.S. Pat. No. 3,506,740 has disclosed the use of polymeric plasticizers such as polybutylene and polypropylene. However, their incompatibility in the polyblend destroys transparency needed for many packaging and appliance uses.

U.S. Pat. No. 3,907,930 has disclosed the use of block copolymers comprising 55 to 90 percent by weight of a monovinylidene aromatic monomer and about 1-45 percent by weight of a diene monomer. Although highly functional in increasing melt flow such copolymers are commercially expensive, hence, raise the cost of the polyblends.

It has now been discovered that low-cost polyethylene waxes formed during polyethylene polymerization are highly functional in increasing the melt flow of HIPS polyblends, yet unexpectedly do not lower the tensile strength or toughness of the formed polyblend parts.

SUMMARY OF THE INVENTION

The present invention relates to polymeric polyblends comprising, based on the total weight of the polyblend:
A. about 80 to 98.5 weight percent of a monoalkenyl aromatic polymer, comprising at least one monoalkenyl aromatic monomer of the formula:

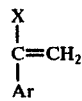

where Ar is selected from the group cconsisting of phenyl, halophenyl alkylphenyl, alkylhalophenyl and mixtures thereof and X is selected from the group consisting of hydrogen, halogen and an alkyl radical of less than three carbon atoms and mixtures thereof,
B. about 1 to 15 percent by weight of a diene rubber moiety dispersed as grafted diene rubber particles, said rubber particles being grafted with and having occluded said monovinylidene aromatic polymer, wherein said grafted diene rubber particles has said grafted and occluded polymer present in an amount of 0.5 to 4 parts to 1 part of rubber, are crosslinked having a swelling index of 5-25 and a weight average particle size diameter of 0.1 to 20.0 microns, and
C. about 0.5-5 percent by weight of a polyethylene wax.

The present invention also relates to methods of improving the melt flow of polymeric polyblends.

DESCRIPTION OF THE PREFERRED EMBODIMENTS

The alkenyl aromatic polymer of the polyblend comprises at least one monoalkenyl aromatic monomer of the formula:

where Ar is selected from the group consisting of phenyl, halophenyl, alkylphenyl and alkylhalophenyl and mixtures thereof and X is selected from the group consisting of hydrogen and an alkyl radical of less than three carbon atoms.

Exemplary of the monomers that can be employed in the present process are styrene; alpha-alkyl monovinylidene monoaromatic compounds, e.g., alpha-methylstyrene, alpha-ethylstyrene, alpha-methylvinyltoluene, ect.; ring-substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4dichlorostyrene, etc.; ring-alkyl, ring-halo-substituted styrenes, e.g., 2-chloro-4-methylstyrene, 2,6-dichloro-4-methylstyrene, etc. If so desired, mixtures of such monovinylidene aromatic monomers may be employed. The average molecular weight of the monoalkenyl aromatic polymers can range from 20,000 to 100,000 Staudinger, preferably 40,000 to 60,000.

The diene rubbers of the polyblend are any rubber polymer (a rubbery polymer having a second order transition temperature not higher than 0° C, preferably not higher than −20° C, as determined by ASTM Test D-746-52T) of one or more of the conjugated, 1,3-dienes, e.g., butadiene, isoprene, 2-chloro-1,3 butadiene, 1 chloro-1,3 butadiene, cyclopentadiene. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g., styrene; an aralkylstyrene, the arethylstyrenes, p-tert-butylstyrene, etc.; an alphamethylstyrene, alphaethylstyrene, alpha-methyl-p-methyl styrene, etc.; vinyl naphthalene, etc.); arhalo monovinylidene aromatic hydrocarbons (e.g., the o-, m-and p-chlorostyrene, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butylacrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and vinylidene chlorides and bromides, etc.); and the like.

Although the rubber may contain up to about 2.0 percent of a crosslinking agent, based on the weight of the rubber-forming monomer or monomers, crosslinking may present problems in dissolving the rubber in the monomers for the graft polymerization reaction. In addition, excessive crosslinking can result in loss of the rubbery characteristics.

A preferred group of rubbers are the sterospecific polybutadiene rubbers formed by the polymerization of 1,3 butadiene. These rubbers have a cis-isomer content of about 30-98 percent and a trans-isomer content of about 70-2 percent and generally contain at least about 85 percent of polybutadiene formed by 1,4 addition with no more than about 15 percent by 1,2 addition. Mooney viscosities of the rubber (ML-4, 212° F.) can range from about 20 to 70 with a second order transition temperature of from about −50° to 31 105° C. as determined by ASTM Test D-746-52T.

The diene rubber can be grafted with the above described monoalkenyl aromatic monomers and can be prepared by mass-suspension polymerization methods as disclosed in U.S. Pat. No. 3,488,743. Those skilled in the art are aware that if one dissolves a diene rubber in the described monomers, that during polymerization the rubber forms a separate rubber-monomer phase with the monomer and the polymer polymerized forms a polymer-monomer phase with the monomer. When the polymer-monomer phase becomes larger during polymerization then the rubber-monomer phase, inverts and disperses as rubber-monomer droplets in the polymer-monomer phase. As the polymerizing mixture is completely polymerized, either by mass or suspension polymerization, e.g., the rubber-monomer droplets polymerize to discrete rubber particles dispersed in the polymer phase forming a polyblend of grafted rubber particles in the polymer phase. The rubber particles are found to be grafted with polymer molecules and also contain occluded polymer of the described monomers.

It has been found possible to analyze the amount of total occluded polymer phase and grafted polymers. The final polymerized polyblend produce (1 gram) is dispersed in a 50/50 acetone/methyl ethyl ketone solvent (10 ml.) which dissolves the polymer phase matrix leaving the rubber phase dispersed. The rubber phase is separated from the dispersion by centrifuge as a gel and dried in a vacuum oven at 50° C. for 12 hours and weighed as a dry gel.

$$\% \text{ Dry gel in Polyblend} = \frac{\text{Weight of dry gel}}{\text{Weight of polyblend}} \times 100$$

$$\left.\begin{array}{l}\% \text{ Graft and} \\ \text{Occlusions} \\ \text{in Rubber}\end{array}\right\} = \frac{\% \text{ dry gel} - \% \text{ rubber}}{\text{Percent rubber*}} \times 100$$

*Percent rubber determined by infra-red spectrochemical analysis of the dry gel $$\left.\begin{array}{l}\text{Parts** by weight} \\ \text{of graft polymer} \\ \text{and occluded} \\ \text{polymer per unit} \\ \text{weight of rubber}\end{array}\right\} = \frac{\% \text{ dry gel} - \% \text{ rubber}}{\text{Percent rubber}}$$

**The present invention preferably has present about 0.5 to 4 grams of occluded and grafted polymer per gram of diene rubber particle.

The amount of grafted and occluded polymer contained in the rubber particle can vary being present in said grafted diene rubber in an amount of from 0.5 to 4.0 parts for each part of rubber, preferably from about 1.0 to 3.5 parts for each part of rubber.

The swelling index of the rubber graft particles is determined by taking the dry gel above and dispersing it in toluene for 12 hours. The gel is separated by centrifuge and the supernatant toluene drained free. The wet gel is weighed and then dried in a vacuum oven for 12 hours at 50° C., and weighed.

$$\text{Swelling Index} = \frac{\text{weight of wet gel}}{\text{weight of dry gel}}$$

As described earlier the amount of occlusions and graft polymer present in the rubber particle is present in the amount of about 0.5 to 4 part for each part of diene rubber. The percent dry gel measured above then is the percent gel in the polymerized polyblend and represents the dispersed rubber phase having polymeric occlusions and polymeric graft. The percent gel varies with the percent rubber charged in the monomer composition and the total amount of graft and occluded polymer present in the rubber phase.

The swelling index of the rubber as determined above is important to the final properties of the polyblend. A low swelling index indicates that the rubber has been crosslinked by the occluded monomer in the rubber particle. The crosslinking stabilizes the particle as to morphology so that the rubber can be dispersed and maintain a particular average particle size critical to the toughness of the polyblend. Generally, a swelling index of 7 to 25, preferably 8-20 provides a rubber particle with sufficient crosslinking for good physical properties in the polyblend.

The weight average particle size of the rubber particle can range from 0.1 to 20.0 microns, preferably 0.5 to 5.0 microns. The weight average particle size is measured with a photosedimentometer by the published procedure of Graves, M. J. et al., "Size Analysis of Subsieve Powders Using a Centrifugal Photosedimentometer," British Chemical Engineering 9:742-744 (1964). A Model 3000 Particle Size Analyzer from Martin Sweets Company, 3131 W. Market St., Louisville, Ky. was used. The rubber is grafted with the monomers described and the grafted polymer preferably has the same monomer composition as the polymer into which the grafted rubber is dispersed.

The polymeric polyblend comprises, based on the total weight of the polyblend about 80 to 98 weight percent of a monoalkenyl aromatic polymer, e.g., polystyrene, which includes that polymer in the matrix phase and that grafted and occluded in the diene rubber phase. It has been found most practical to prepare the monoalkenyl aromatic polymer and the grafted diene rubber polymer simultaneously as disclosed above by dissolving the diene rubber in the monoalkenyl aromatic monomer and polymerizing the monomer by mass polymerization forming these two components of the polyblend simultaneously. The range of rubber dissolved can range from 1 to 15 weight percent preferably from 2.5 to 10 weight percent of the polymerized polyblend.

The waxes useful in the present invention are polyethylene hydrocarbons formed by the polymerization of ethylene. They have a molecular weight of from about 500 to 2400 and a dispersion index of from about 1 to 5, preferably from about 500 to 1700 with a dispersion index of from about 1.2 to 2.5. The ratio of the weight average molecular weight to the number average molecular weight or $M_w/M_n$ is known as a dispersion index or a molecular weight distribution index. Amounts of from about 0.5 to 5 percent by weight of the wax are incorporated in the polyblend either during polymerization or by melt blending with the polymerized polyblend.

The polyethylene waxes are commercially available from Eastman Chemical of Kingsport, Tenn., under the trademark, "Epolene Waxes", e.g., grades N-14, N-45 and C-305G.

The polyethylene waxes are not considered to be lubricants or plasticizers for the matrix phase as the physical properties such as tensile strength are not impaired. They have been found to be compatible with the rubber phase of the polyblend and are believed to increase the deformation of the rubber phase overcoming the filler effect of the crosslinked rubber increasing the melt flow of the polyblend and the elongation of the polyblend at the Tg of the matrix polymer phase which is particularly important in sheet forming applications. Unexpectedly, the particular polyethylene waxes of the present invention have this unique compatibility with rubber phase at the melt temperature of the polyblend giving superior melt flow and tensile strength at the Tg or melt temperature of the matrix phase.

The following examples are given for illustrative purposes and the invention is not limited thereto.

EXAMPLE 1

CONTROL

A polymerization mixture comprising about 7.6 weight percent of butadiene rubber having a cis 1,4 content of about 35 weight percent and a Mooney viscosity of 55 dissolved in about 92.4 percent of styrene monomer is charged to a suitable reaction vessel. After adding about 0.1 weight percent of t-butyl perbenzoate catalyst and about 0.06 weight percent of a tert-dodecyl mercaptan chain transfer agent based on the polymerization mixture, the reaction vessel is purged of oxygen by a stream of nitrogen and the polymerization mixture stirred and heated under reflux conditions at 105° C. for 195 minutes to effect heat transfer and polymerize about 30 percent of the styrene monomer.

The resulting partially polymerized syrup is then suspended in heated water having suitable suspending agents dispersed therein. The suspension is thereafter heated to 160° C., and stirred to effect heat transfer and maintain the suspension for 195 minutes sufficient to effect essentially complete conversion of the monomer to polymer. Finally, the suspension is cooled, centrifuged, washed and dried to recover the polyblend particles as beads.

The suspension polymerization is run with a water to partially polymerized mixture ratio of about 1:1. This ratio can be varied from 2:1 to 4:5, however, about 1:1 is preferred. An antioxidant (trisnonylphenyl) phosphate 0.15 weight percent) is used in the mass-poly step. The suspending agent is a 95:5 mol percent acrylic acid and 4.5 mol percent 2-ethylhexyl acrylate polymer having a specific viscosity of 4.0 as determined in a 1 percent solution in water and described in U.S. Pat. No. 3,051,682. The suspending agent is used in amounts of about 0.18 weight percent based on the water.

EXAMPLE 2

About 99 parts of the polyblend beads of Example 1 were dry blended with about 1 part of polyethylene wax having a molecular weight of about 500 and a dispersion index of 2.0 and melt blended in a 1 ½ inch (3.75 cm) extruder having a L/D of 24:1 operating at 40 rpm., 250° C., and 2000 psi back pressure (1.4 = $10^{-6}$ kg/m²) forming the polyblend into pellets.

The polyblends of Examples 1 and 2 were tested for physical properties with the test data shown in Table 1.

TABLE I

| Sample | Izod Impact[1] Strength | Tensile[2] Strength | Melt[3] Viscosity |
|---|---|---|---|
| Example 1 | 8.2 | $2.5 \times 10^{-6}$ | 87 |
| Example 2 | 8.7 | $2.4 \times 10^{-6}$ | 63 |

[1]Izod Impact Strength kg.cm/cm (ASTM D 256-67)
[2]Tensile Strength at yield kg./m² (ASTM D 638-68)
[3]Melt Viscosity in (poises $\times 10^{-3}$) at 200° C. (ASTM D 1238-65)

EXAMPLE 3

Example 2 was repeated using 97 parts of the polyblend of Example 1 and 3 parts of a polyethylene wax having a molecular weight of 500 and a dispersion index of 3. The polyblend had a melt viscosity of $58 \times 10^3$ poises at 200° C. with an impact strength of about 8.7 kg.cm/cm and a tensile strength of about 2.35 kg./m².

It is evident from the data that the polyethylene waxes increase and improves the melt viscosity of HIPS polyblends without sacrificing the impact strength or tensile strength providing a composition with great utility and a method of improving the melt flow of such polyblends.

EXAMPLE 4

Example 1 was repeated wherein 7.6 parts of rubber and 1 part of polyethylene wax were dissolved in 91.4 parts of styrene and polymerized in the process of Example 1. The polyblend formed was tested and found to have an impact strength of 8.3 kg.cm./cm, a tensile strength of $2.43 \times 10^{-6}$ kg./m² and a melt viscosity of 61,000 poise at 200° C.

It is evident from these data that the polyethylene wax may be incorporated in the polyblend during polymerization of the polyblend providing the polyblend with a lower melt viscosity without loss of toughness or tensile strength.

EXAMPLES 5 – 9

The polyblend of Example 1 was melt blended with various weight percentages of polyethylene wax, low molecular weight polypropylene and mineral oil to determine the efficiency of such additives in increasing elongation at temperatures near the Tg of the polymer as associated with deep drawing fabrications. Table 2 below tabulates the formulations tested and the test results.

TABLE 2

| Formulation | EXAMPLES | | | | |
|---|---|---|---|---|---|
| | 5 | 6 | 7 | 8 | 9 |
| HIPS | 100 | 98.5 | 97.0 | 98.5 | 9.8 |
| Polyethylene Wax[1] | — | — | — | 1.5 | 1.5 |
| Polypropylene[2] | — | 1.5 | — | — | — |
| Mineral Oil[3] | — | — | 3.0 | — | — |
| % Elongation[4] | | | | | |
| at fail 23° C. | 10 | 13 | 39 | 25 | 28 |
| at fail 90° C. | 20 | 23 | 15 | 40 | 45 |

[1]Polyethylene wax of Example 2.
[2]Polypropylene-amorphous, viscosity of 500-2500 cps at 190° C., M.P. of 145-160° C., SW-500 HL-O, Scott Wise Polymers Co., Crowley, Louisiana 70526.
[3]Mineral oil - parafinic oil, M.W. 340 Arcopreme 90, Atlantic Richfield Co., Philadelphia, Pa.
[4]ASTM D 638-68.

It is evident from the data that amorphorous atactic polypropylene does not provide materially improved elongation for the base polymer at higher temperatures. Mineral oil decreases elongation at higher temperatures whereas the polyethylene wax provides high elongation giving a composition of great utility for deep drawing applications.

What is claimed is:

1. A polymeric polyblend having high melt flow comprising, based on the total weight of the polyblend:
   A. about 80 to 98.5 weight percent of a mono-alkenyl aromatic polymer, comprising at least one monoalkenyl aromatic monomer of the formula:

$$\begin{array}{c} X \\ | \\ C=CH_2 \\ | \\ Ar \end{array}$$

where Ar is selected from the group consisting of phenyl, halophenyl alkylphenyl, alkylhalophenyl and mixtures thereof and X is selected from the group consisting of hydrogen, halogen and an alkyl radical of less than three carbon atoms and mixtures thereof,
   B. about 1 to 15 percent by weight of a diene rubber moiety dispersed as grafted diene rubber particles, said rubber particles being grafted with and having occluded said monovinylidene aromatic polymer, wherein said grafted diene rubber particles has said grafted and occluded polymer present in an amount of 0.5 to 4 parts to 1 part of rubber, are crosslinked having a swelling index of 5-25 and a weight average particle size diameter of 0.1 to 20.0 microns, and
   C. about 0.5-5 percent by weight of a polyethylene wax having a molecular weight of from about 500 to 2400 and a dispersion index of from 1-5.

2. A polymer of claim 1, wherein at least one of said monoalkenyl aromatic monomer is styrene.

3. A polyblend of claim 1, wherein at least one of said monoalkenyl aromatic monomer is alphamethyl styrene.

4. A polyblend of claim 1, wherein at least one of said monoalkenyl aromatic monomer is chlorostyrene.

5. A polyblend of claim 1, wherein said diene rubber is selected from the group consisting of polybutadiene, polyisoprene, polychloroprene and butadiene-styrene, butadiene-acrylonitrile, butadiene-alpha methyl styrene copolymers or mixtures thereof.

6. A polyblend of claim 1, wherein said diene rubber is a stereospecific polybutadiene rubber having a cis-isomer content of about 30 to 98 percent, a trans-isomer content of about 70-2 percent, Mooney viscosity of about 20° to 70° (ML-4 212° F.), at least about 85 percent of polybutadiene formed by 1,4 addition with no more than 15 percent 1,2 addition and a Tg range of from about −50° to −105° C.

7. A polyblend of claim 1, wherein said polyethylene wax has a molecular weight of from about 500 to 2400 and a dispersion index of from about 1-5.

8. A polyblend of claim 1, wherein the monoalkenyl aromatic monomer is styrene, the diene rubber is polybutadiene and wherein said grafted diene rubber particles has said grafted and said occluded polymer present in an amount of 0.5 to 4 parts to 1 part of rubber, are crosslinked having a swelling index of 5-25 and a weight average particle size diameter of 0.1 to 20.0 microns and wherein said polyethylene wax has a molecular weight of from about 500 to 2400 and a dispersion index of from about 1-5.

9. A method of improving the flow and ductility of a polymeric polyblend of:
   A. about 80 to 98.5 weight percent of a monoalkenyl aromatic polymer, comprising at least one monoalkenyl aromatic monomer of the formula:

$$\begin{array}{c} X \\ | \\ C=CH_2 \\ | \\ Ar \end{array}$$

where Ar is selected from the group consisting of phenyl, halophenyl alkylphenyl, alkylhalophenyl and mixtures thereof and X is selected from the group consisting of hydrogen, halogen and an alkyl radical of less than three carbon atoms and mixtures thereof, and
   B. about 1 to 15 percent by weight of a diene rubber moiety dispersed as rubber particles, said rubber particles being grafted with and having occluded said monovinylidene aromatic polymer, wherein said grafted diene rubber particles has said grafted and said occluded polymer present in an amount of 0.5 to 4 parts to 1 part of rubber, are crosslinked having a swelling index of 5-25 and a weight average particle size diameter of 0.1 to 20.0 microns,
the method comprising: melt mixing (A) and (B) with
   C. about 0.5 to 5 percent by weight of a polyethylene wax having a molecular weight of from about 500 to 2400 and a dispersion index of from about 1-5.

10. A method of claim 9, wherein at least one of said monoalkenyl aromatic monomer is styrene.

11. A method of claim 9, wherein said diene rubber is selected from the group consisting of polybutadiene, polyisoprene, polychloroprene and butadiene-styrene, butadiene-acrylonitrile, butadiene-alpha methyl styrene copolymers or mixtures thereof.

12. A method of claim 9, wherein said diene rubber is stereospecific polybutadiene rubber having a cis-isomer content of about 30 to 98 percent, a trans-isomer content of about 70-2 percent, Mooney viscosity of about 20° to 70° (ML-4 212° F.), at least about 85 percent of polybutadiene formed by 1,4 addition with no more than 15 percent by 1,2 addition and a Tg range of from about −50° to −105° C.

13. A method of claim 9, wherein (A), (B) and (C) are melt mixed during the polymerization of (A) and (B).

* * * * *